(12) United States Patent
Wang et al.

(10) Patent No.: US 11,444,813 B1
(45) Date of Patent: Sep. 13, 2022

(54) METHOD AND APPARATUS FOR CTLE EQUALIZER ADAPTATION BASED ON SAMPLES FROM ERROR SLICERS

(71) Applicant: MACOM Technology Solutions Holdings, Inc., Lowell, MA (US)

(72) Inventors: Jian Wang, Red Bank, NJ (US); Nicolas Nodenot, La Colle sur Loup (FR)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/384,504

(22) Filed: Jul. 23, 2021

(51) Int. Cl.
*H04L 25/08* (2006.01)
(52) U.S. Cl.
CPC .................... *H04L 25/08* (2013.01)
(58) Field of Classification Search
CPC ........................................ H04L 25/08
See application file for complete search history.

(56) References Cited

U.S. PATENT DOCUMENTS

| | | | |
|---|---|---|---|
| 2005/0180287 A1* | 8/2005 | Lee ................. | G11B 20/1426 369/59.21 |
| 2010/0008413 A1* | 1/2010 | Yamazaki ............... | H04B 3/06 375/232 |
| 2010/0164425 A1* | 7/2010 | Son ......................... | H01Q 1/27 318/648 |
| 2011/0019831 A1* | 1/2011 | Liu ....................... | H04M 9/082 381/66 |

* cited by examiner

*Primary Examiner* — Dac V Ha
(74) *Attorney, Agent, or Firm* — Weide & Miller, Ltd.

(57) ABSTRACT

A method and apparatus for adapting an equalizer coefficients to a channel comprising filtering a high frequency error monitor slicer output and a data slicer output to isolate selected high frequency symbol values. Filtering a low frequency error monitor slicer output and the data slicer output to isolate selected low frequency symbol values. Generating a high frequency error monitor slicer threshold signal with a first adaptation module. Generating a low frequency error monitor slicer threshold signal with the first adaptation module or a second adaption module. Combining the high frequency error monitor slicer threshold signal and the low frequency error monitor slicer threshold signal to generate a difference signal. Integrating the difference signal with an accumulator to generate equalizer coefficients to adapt the equalizer to the channel. Providing the high frequency and low frequency error monitor slicer threshold signal to respective slicers.

18 Claims, 8 Drawing Sheets

METHOD AND APPARATUS FOR CTLE EQUALIZER ADAPTATION BASED ON SAMPLES FROM ERROR SLICERS

1. FIELD OF THE INVENTION

The invention relates to equalizer adaptation and in particular to a method and apparatus for adaption using high frequency and lower frequency thresholds.

2. RELATED ART

High speed data communication over a channel leads to attenuation of high frequency components of the transmitted signals. This degrades signal quality and limits transmit speeds, leading to reduced bandwidth. To overcome this drawback, numerous data communication systems rely on equalizers to compensate for the unwanted effects of the channel. The equalizers have numerous coefficients (values or settings) which may be adjusted to optimally compensate for the effects of the channel on the signal.

Establishing the equalizer values is a complex task, and incorrectly selecting the coefficient values for the equalizer leads to sub-optimal equalization, which, as described above, reduces bandwidth and data transmit rates. In many prior art systems, the equalization was made easier by use of additional equalizers, such as use of a decision feedback equalizer (DFE) and/or a feed forward equalizer (FFE). The channel could be characterized from the DFE and FFE post-tap values and this information would be used to establish the CTLE coefficients. However, to gain the benefits of reduced size, cost, and power consumption, many communication systems avoid use of a DFE or FFE.

When the DFE and FFE are not present, prior art methods rely on time consuming and complex eye monitor analysis to determine equalizer settings which optimize eye diagram plots. Besides the associated complexity with this approach, the analyzes of eye diagram plots, such as for example, eye-height analysis, may lead to false peaks, which result in sub-optimal equalizer settings. In addition, it is difficult to run continuous adaption due to temperature and voltage variations over time. Prior art CTLE coefficient calculations often present non-monotonic performance and introduce local extreme (minimum/maximum).

SUMMARY

To overcome the drawbacks of the prior art and provide additional benefits, a method and apparatus is disclosed for generating equalizer coefficients comprising an equalizer configured to equalize a received signal to compensate for a channel over which the received signal traveled. Also part of this embodiment is a data slicer configured to quantize the equalized signal to generate primary sliced data. A high frequency error slicer is configured to slice the equalized signal to generate first error based on a high frequency slicer threshold and a low frequency data slicer is configured to slice the equalized signal to generate second sliced error on a low frequency slicer threshold. A high frequency processing module is provided and includes a high frequency data pattern filter configured to generate error filtered by high frequency data from the first sliced error, and a high frequency adaptation module configured process the error filtered by the high frequency data to generate the high frequency slicer threshold. A low frequency processing module is provided and includes a low frequency data pattern filter configured to generate error filtered by low frequency data from the second sliced error, and a low frequency adaptation module configured process the error filtered by the low frequency data to generate the low frequency slicer threshold. A summing junction is configured to combine the high frequency slicer threshold and the low frequency slicer threshold to create a difference signal. An integrating accumulator configured to processes such as through summing or accumulation, over time, the difference signal to generate the equalizer coefficients.

In one embodiment, the system further comprises one or more de-serializers configured to convert a serial data steam to two or more parallel data streams. The system of claim 1 wherein the high frequency data pattern filter filters the sliced data based on a high frequency data pattern mask and a high frequency data pattern. The high frequency adaptation module processing may comprise an integrating accumulator that accumulates HF errors and generates HF slicer threshold. The system may further comprise a multiplexer configured to output the difference signal or an inverted version of the difference signal responsive to a control signal. In one configuration the system further comprises a multiplier configured to multiply the difference signal or an inverted version of the difference signal with an adaptation timing control signal to control the rate at which the equalizer coefficient(s) are updated.

Also disclosed is a method for adapting an equalizer to a channel comprising filtering a high frequency error monitor slicer output and a data slicer output to isolate errors selected by high frequency symbol values. Filtering a low frequency error monitor slicer output and the data slicer output to isolate errors selected by low frequency symbol values and generating a high frequency error monitor slicer threshold signal with a first adaptation module. Also part of this method is the step of generating a low frequency error monitor slicer threshold signal with the first adaptation module or a second adaption module and providing the high frequency error monitor slicer threshold signal to a high frequency error monitor slicer. The low frequency error monitor slicer threshold signal is provided to a low frequency error monitor slicer. This method also combines the high frequency error monitor slicer threshold signal and the low frequency error monitor slicer threshold signal to generate a difference signal. The difference signals are integrated with an accumulator to generate equalizer coefficients to adapt the equalizer to the channel, such as by generating the equalizer settings with the accumulator and feeding back the equalizer settings to the equalizer.

In one variation, this method further comprises quantizing different signals, namely, quantizing an equalized signal based on the high frequency error monitor slicer threshold signal to generate the high frequency error monitor slicer output; quantizing the equalized signal based on the low frequency error monitor slicer threshold signal to generate the high frequency error monitor slicer output; and quantizing the equalized signal with a data slicers to generate the data slicer output. The action of quantizing may also be referred to as slicing, such as with a slicer, which including comparing an input signal with a comparator to one or more values (thresholds) stored in the slicer and defining the output from the slicer as one of the one or more value based on the comparison. In one embodiment, this method further comprising adding an offset to the difference signal. It is also contemplated that the difference signal may be multiplied with an adaptation timing control signal to control the rate of change of adaptation of the equalizer. This method of operation may also include providing either the difference signal or an inverted difference signal to the accumulator based on which symbol group was filtered. In one configuration, the filtering of the high frequency error monitor slicer output and the data slicer output is based on a high frequency data mask and a high frequency data pattern and filtering the low frequency error monitor slicer output and the data slicer output is based on a low frequency data mask and a low frequency data pattern.

In another embodiment, a method is disclosed for adapting an equalizer by generating equalizer coefficients that comprises generating a high frequency slicer threshold value by filtering high frequency components of an equalized signal and generating a low frequency slicer threshold value by filtering low frequency components of an equalized signal. Then, combining the high frequency slicer threshold value and the low frequency slicer threshold value to create a difference signal and accumulating the difference signal over time with an integrating accumulator to generate an accumulator value and updating equalizer coefficients when the accumulator value reaches a predetermined value.

In one configuration, this method further comprises providing the high frequency slicer threshold value to a high frequency error monitor slicer and providing the low frequency slicer threshold value to a low frequency error monitor slicer. This method may further comprise adding an offset to the difference signal to adjust the equalizer coefficients. In one embodiment, this method also includes multiplying the difference signal with an adaptation timing control signal to control the rate of change of adaptation of the equalizer.

In one configuration, either the difference signal or an inverted difference signal is provided to the accumulator based on which symbol group was filtered. It is contemplated that generating the high frequency slicer threshold value is based on a high frequency data mask and a high frequency data pattern and generating the low frequency slicer threshold value is based on a low frequency data mask and a low frequency data pattern.

Other systems, methods, features and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
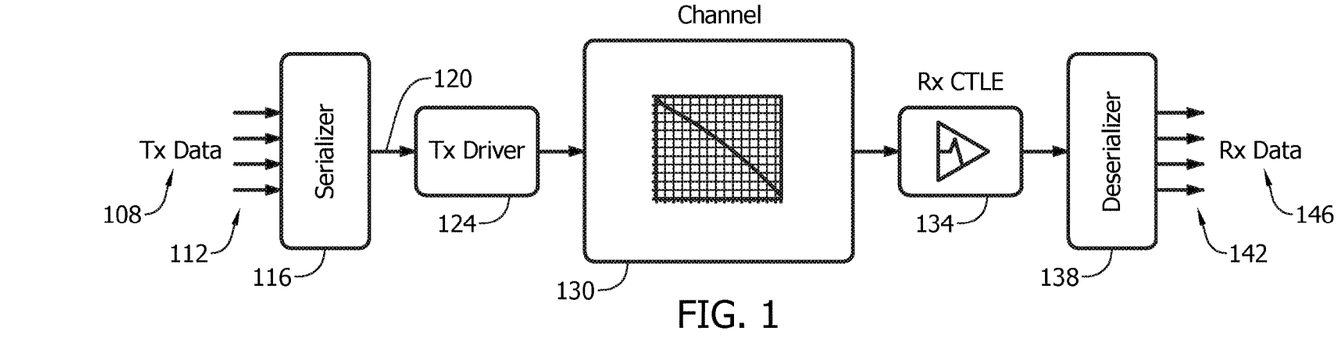
FIG. 1 illustrates an exemplary communication system.

FIG. 1 illustrates an exemplary communication system. This is but one possible environment of use of the innovation disclosed herein. As shown, data to be transmitted, referred to as transmit data 108 is provided over two or more parallel paths 112 to a serializer 116. The serializer 116 converts the data on the two or more parallel paths 112 to a serial stream of data on serial data path 120. The serial stream of data is presented to a driver 124 which amplifies the signal to a level suitable for transmission over a channel 130. The channel 130 may be any type of channel suitable for high speed data transmission. In one embodiment, the channel 130 is a very short reach channel, which may only be several centimeters of PCB trace long. However, the method and apparatus disclosed herein may be used for channels of any length or type, such as but not limited to, fiber channels, circuit board traces, or wired channels, all of which may be any length.

After passing through the channel 130, the data is presented to a receiver equalizer 134, which in this embodiment is a continuous time linear equalizer (CTLE). The equalizer is configured to reduce the signal attenuating effects of the channel 130. After equalization, the data is provided to a de-serializer 138 which converts the serial data stream to a parallel data path on the two or more data paths 142. The data is output as received data 146.

Figure 2:
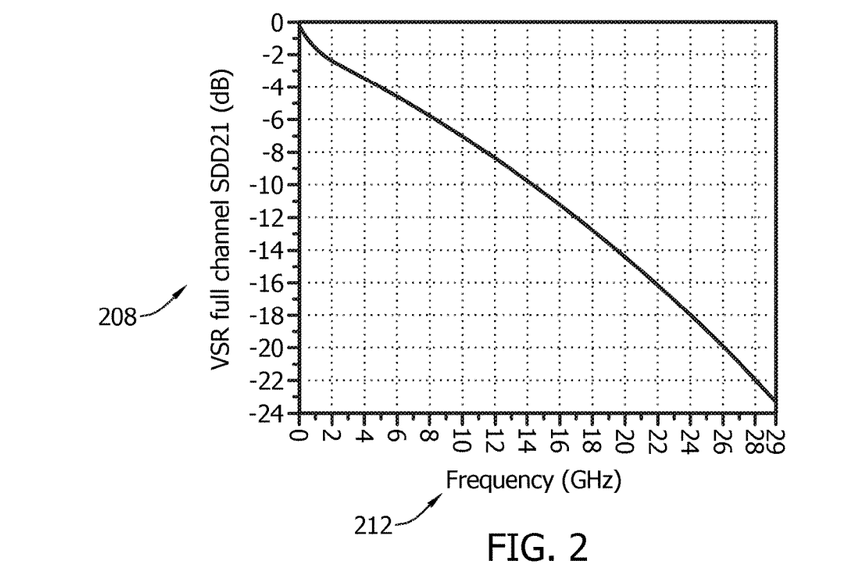
FIG. 2 illustrates a plot of an exemplary channel transfer function.

As is generally understood, passage of the data signal through the channel 130 attenuates the signal. FIG. 2 illustrates a plot of an exemplary channel transfer function. The vertical axis 208 represents signal attenuation while the horizontal axis 212 represents frequency. As can be seen, the channel attenuates high frequencies to a larger degree than low frequencies. Thus, the higher the frequency the more attenuation the signal suffers. The equalization is configured to reverse or compensate for this affect, such as by boosting high frequencies based on channel attenuation.

Figure 3:
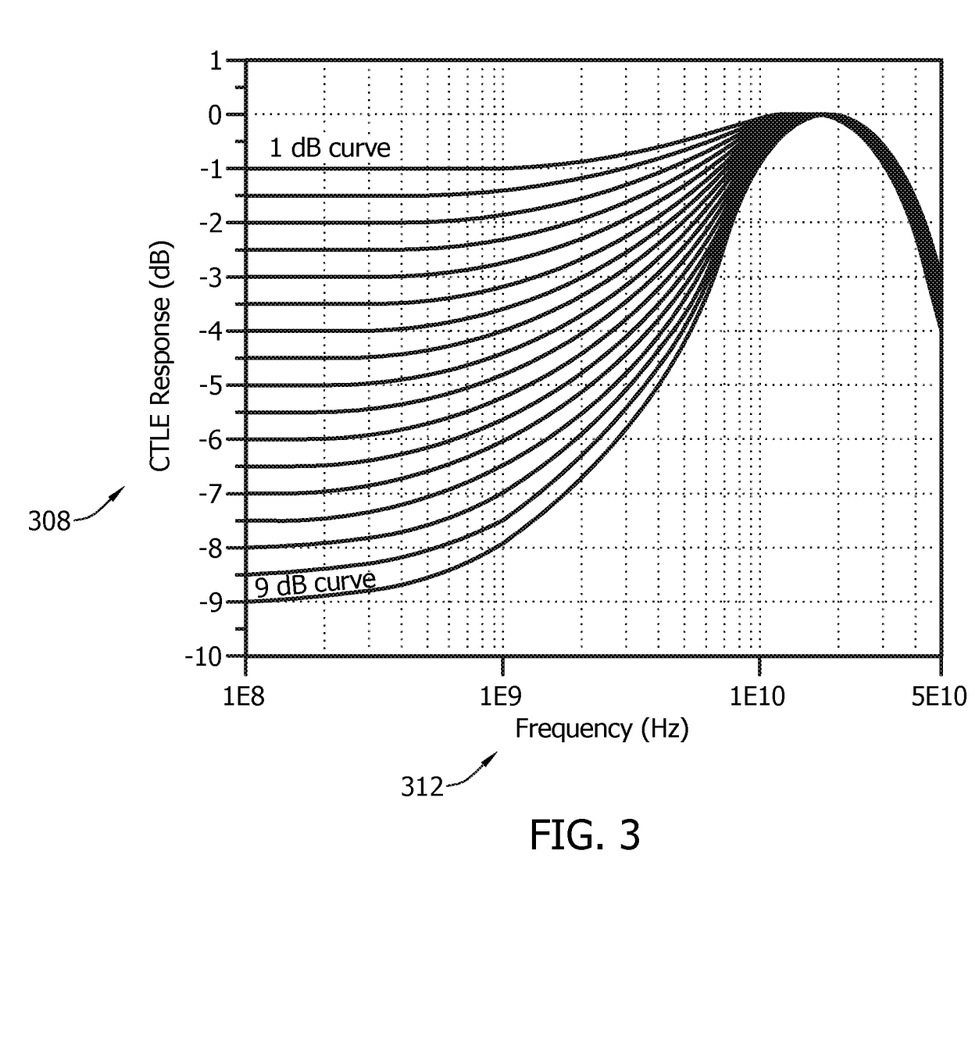
FIG. 3 illustrates exemplary transfer function plots for an equalizer.

FIG. 3 illustrates exemplary transfer function plots for an equalizer having different boost levels. Numerous equalization plots are shown to account for different DC gain levels. In other embodiments, only one gain (boost) curve may be provided. As shown, the vertical axis 308 represents attenuation while the horizontal axis 312 represents frequency. As can be observed from this plot, high frequencies are boosted by the equalizer to compensate for the channel.

Figure 4A:
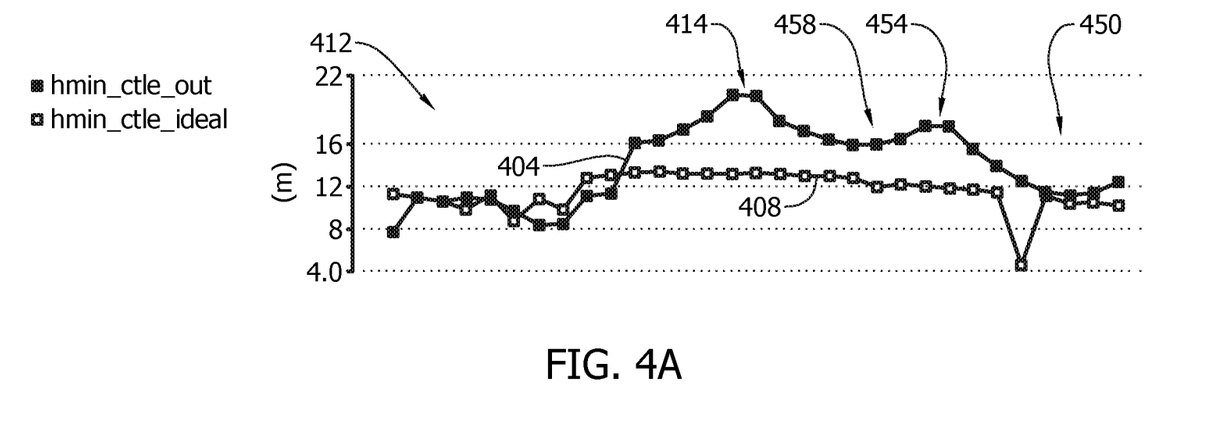
FIG. 4A and FIG. 4B illustrate ideal and actual CTLE sweep output for eye height and eye width.
Figure 4B:
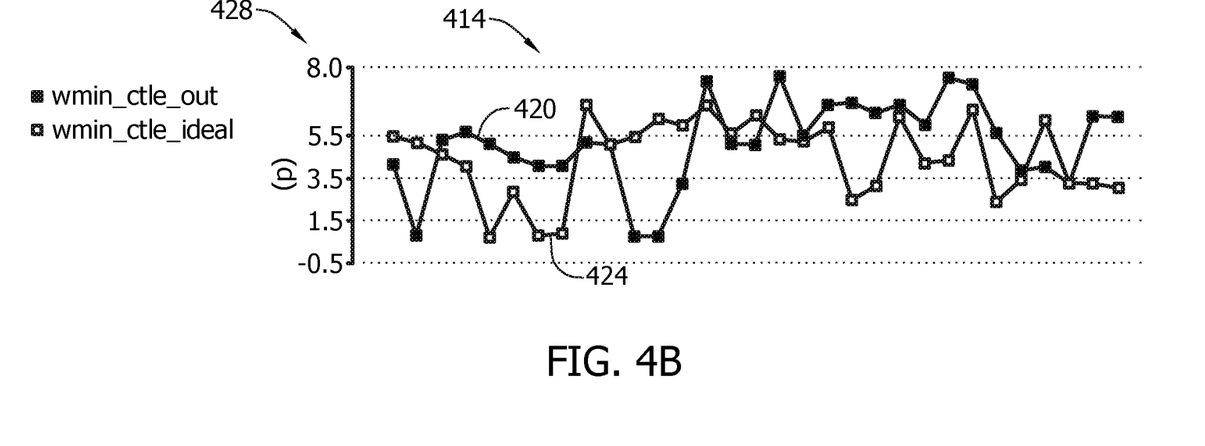

One challenge with prior art CTLE performance is that equalizer settings are established by eye monitors. The plots shown in FIGS. 4A and 4B illustrate ideal and actual CTLE sweep output for eye height and eye width. FIG. 4A illustrates the ideal eye height plot 408, and the actual eye height plot 404 for different CTLE settings. The vertical axis 412 represents millivolts and the horizontal axis 414 represents a sweep of equalizer coefficients. FIG. 4B illustrates the ideal eye width plot 424 and the actual eye width plot 420 for different CTLE settings. In FIG. 4B, the vertical axis 428 represents picoseconds. The different settings in the CTLE are available to address different channel types and changing channel conditions over time. The goal is to configure the equalizer with the best settings to provide optimal equalization.

Using the metrics of eye-height and eye-width, the actual measured values deviate from ideal. With regard to the eye height, it is desired to use the CTLE settings which establish the largest eye-height, such as at points 414 to provide the largest (tallest) eye-height opening. However, during adaptation to establish optimal settings, the adaptation may progress from either end of the plot to obtain the ideal settings. As the adaptation proceeds from, for example, area 450 toward a false peak 454, the equalizer may determine that the adaption coefficients are ideal at the false peak 454 because in area 458 the eye-height begins to decrease, and thus these settings may be used in the equalizer.

However, the false peak 454 is not optimal because the actual peak is at area 414. This may also be referred to as a falling peak. The equalizer settings that yield eye height at area 414 is actual ideal. This process may be referred to as gradient based, which is calculation based on the derivative of the function. As a result, the prior art methods of equalizer adaptation yield equalizer settings which are not optimal. The method and apparatus disclosed herein overcomes this drawback in the prior art.

Figure 5A:
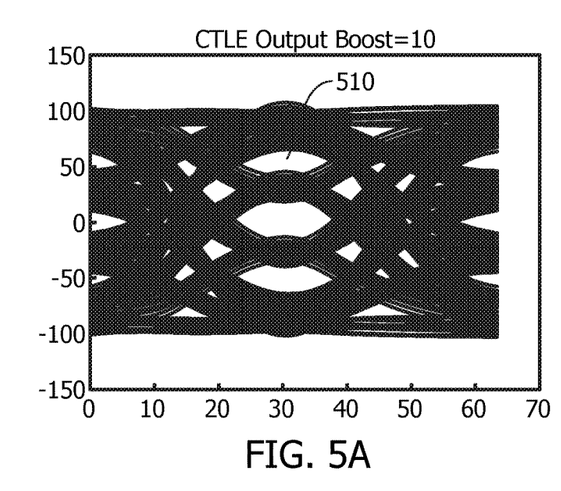
FIG. 5A, FIG. 5B, FIG. 5C, and FIG. 5D illustrate exemplary eye diagram plots at different coefficient values, referred to herein as boost settings.
Figure 5B:
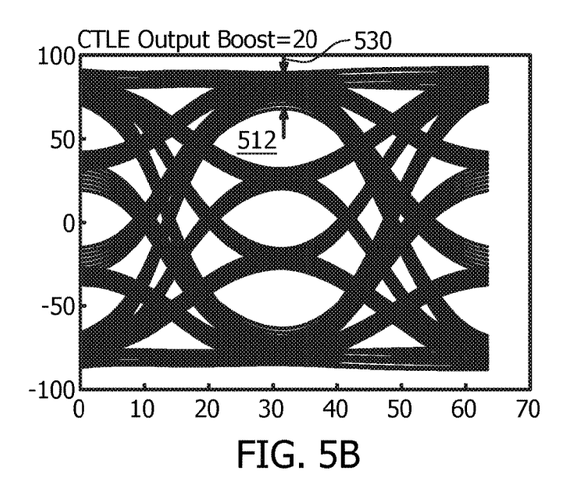
Figure 5C:
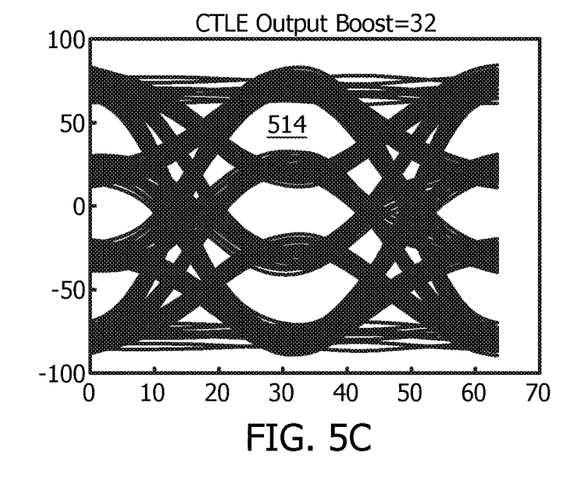
Figure 5D:
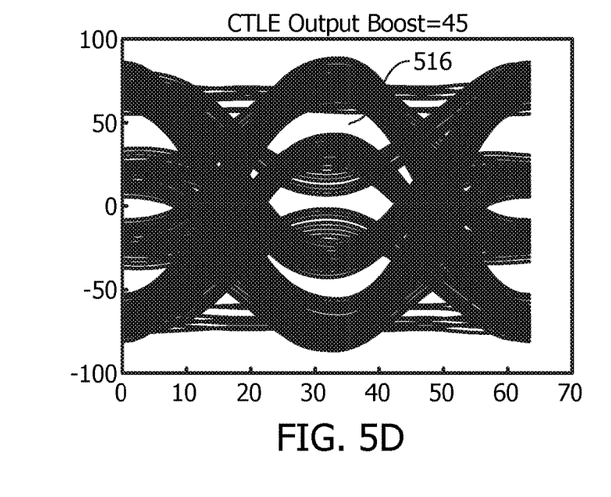

FIGS. 5A, 5B, 5C, and 5D illustrate exemplary eye diagram plots at different coefficient values, referred to herein as boost settings. These figures are for purposes of discussion and the innovation is not limited to these particular plots. In these plots, there are four possible data levels (0, 1, 2, 3) and periodic transitions, such as occurs with PAM4 encoding. The sample or slice points are at sample 0, sample 32, and sample 64, and the sampling (slicing) repeats over time. As can be seen in FIGS. 5A and 5D, the eye openings 510, 516, while slightly opened, are generally collapsed indicating that the equalizer settings are not ideal. Thus, equalizer settings which establish a boost setting of 10 and 45 are not ideal. In contrast, the plots of FIGS. 5B and 5C show eye openings 512, 514 as being generally open, with the plots in FIG. 5B being more open as compared to the plot of FIG. 5C. It is difficult to determine however, the optimal boost setting based only on the eye height measurements. For example, when trying different equalizer settings, there may be a local minimum (false peak) that appears as an optimal setting but is actually not the best equalizer setting. This is further complicated by changes over time with changes in temperature and aging. Another drawback of the prior art is overshoot. If the equalizer over-compensates, then the signal eye is distorted due to the high frequencies being over compensated.

Figure 6:
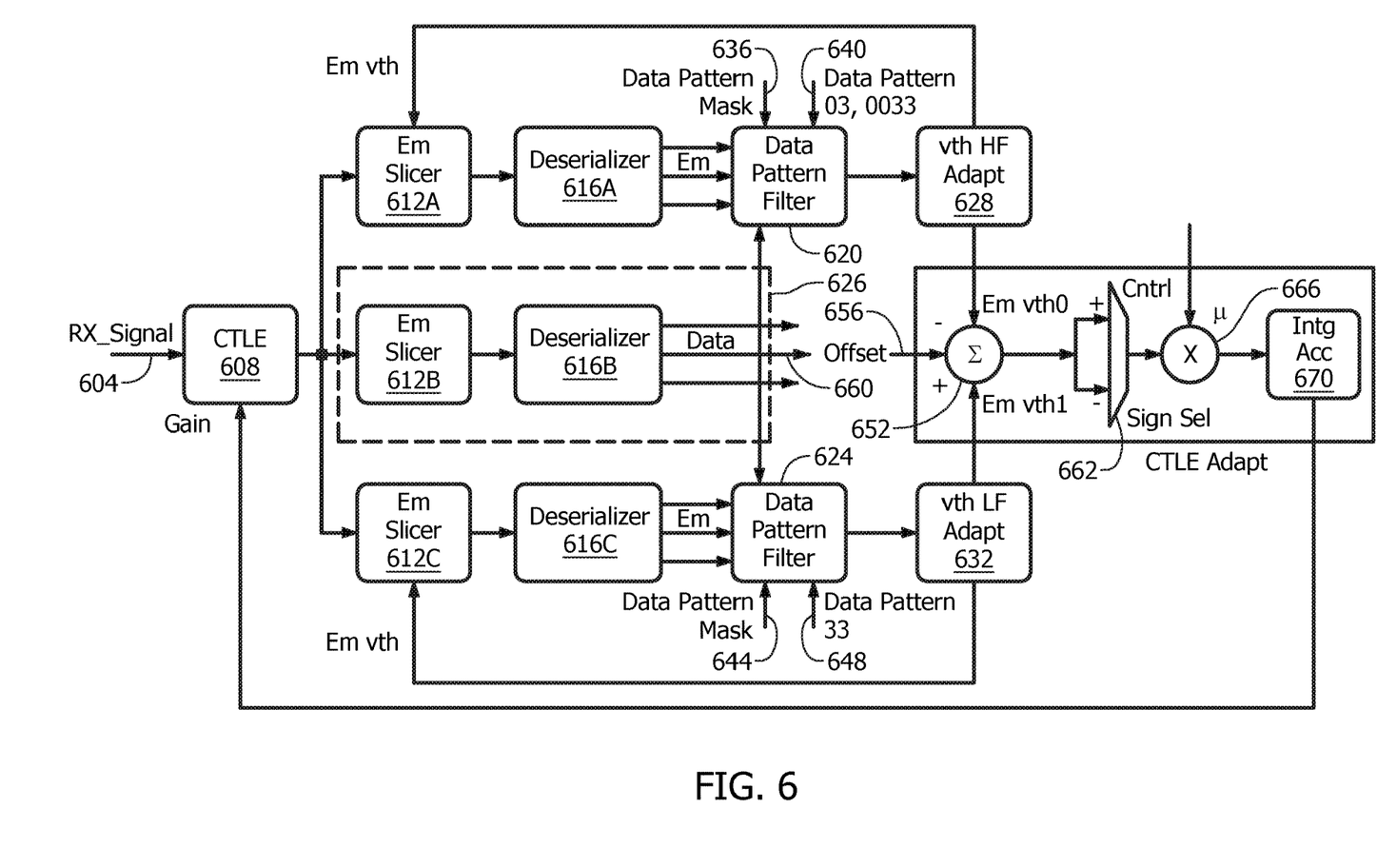
FIG. 6 illustrates a block diagram of an example implementation of the high frequency, low frequency threshold adaptation.

FIG. 6 illustrates a block diagram of an example implementation of the high frequency, low frequency threshold adaptation. This is but one possible embodiment and as such, one of ordinary skill in the art may arrive at different implementations without departing from the scope of the claims. In general, this system utilizes two error-monitor slicers to run threshold adaptation for high frequency and low frequency signal levels and also implements an LMS algorithm or a modified LMS algorithm to adapt the CTLE gain so that the difference (error) between the two adapted high and low frequency slicer threshold levels are minimized or optimized.

In this example embodiment, an incoming data signal, on input 604, is provided to a CTLE 608 for equalization. The CTLE 608 receives a feedback signal, referred to herein as gain or the updated equalizer coefficients. Although shown as being implemented in a CTLE, it is contemplated that any equalizer may be used in place of the CTLE. The output of the CTLE 608 is provided to a high frequency error monitor (em) slicer 612A, a low frequency error monitor slicer 612C, and data slicer 612B. A feedback signal input to the HF slicer 612A, is referred to as a high frequency error monitor voltage threshold signal, which is the slice point for slicer 612A. A feedback signal input to the LF slicer 612C, is referred to as a low frequency error monitor voltage threshold signal, which is the slice point for slicer 612C. The slice point feedback signals are adjusted over time as discussed below.

The slicers 612A, 612B, 612C process the equalized signal to generate a digital signal which has been quantized to one of the slicer levels as determined by each individual slicer. After slicing, the signal is provided to de-serializers 616A, 616B, 616C which convert the serial input stream to two or more lower rate data streams on parallel data conductors. De-serialization reduces the data rate of the signals to facilitate processing at lower speeds. The outputs of the de-serializers 616A and 616B are fed into a data pattern filter 620, while the outputs of the de-serializers 616B and 616C are fed into a data pattern filter 624. The output of de-serializer 616A is a high frequency error monitor signal and the output of de-serializer 616C is a low frequency error monitor signal. The main data path 626 generates a system output which may be multiple parallel paths 660. Also provided is a CDR, not shown, which isolates and distributes a clock signal to the slicer and de-serializer to maintain clock synchronization.

The system and associated algorithms process the de-serializer outputs as discussed below to generate the equalizer coefficients which is provided in a feedback signal to the CTLE 608. In this embodiment there is a high frequency data path (upper path) and a low frequency data path (lower path). As discussed above, the channel has different effects on the high frequency signal components than on the low frequency signal components. For example, as the signal transitions from a level 0 to 3, it contains high frequency signal components, while a transition from level 3 to level 3 contains low frequency signal components.

Figure 7:
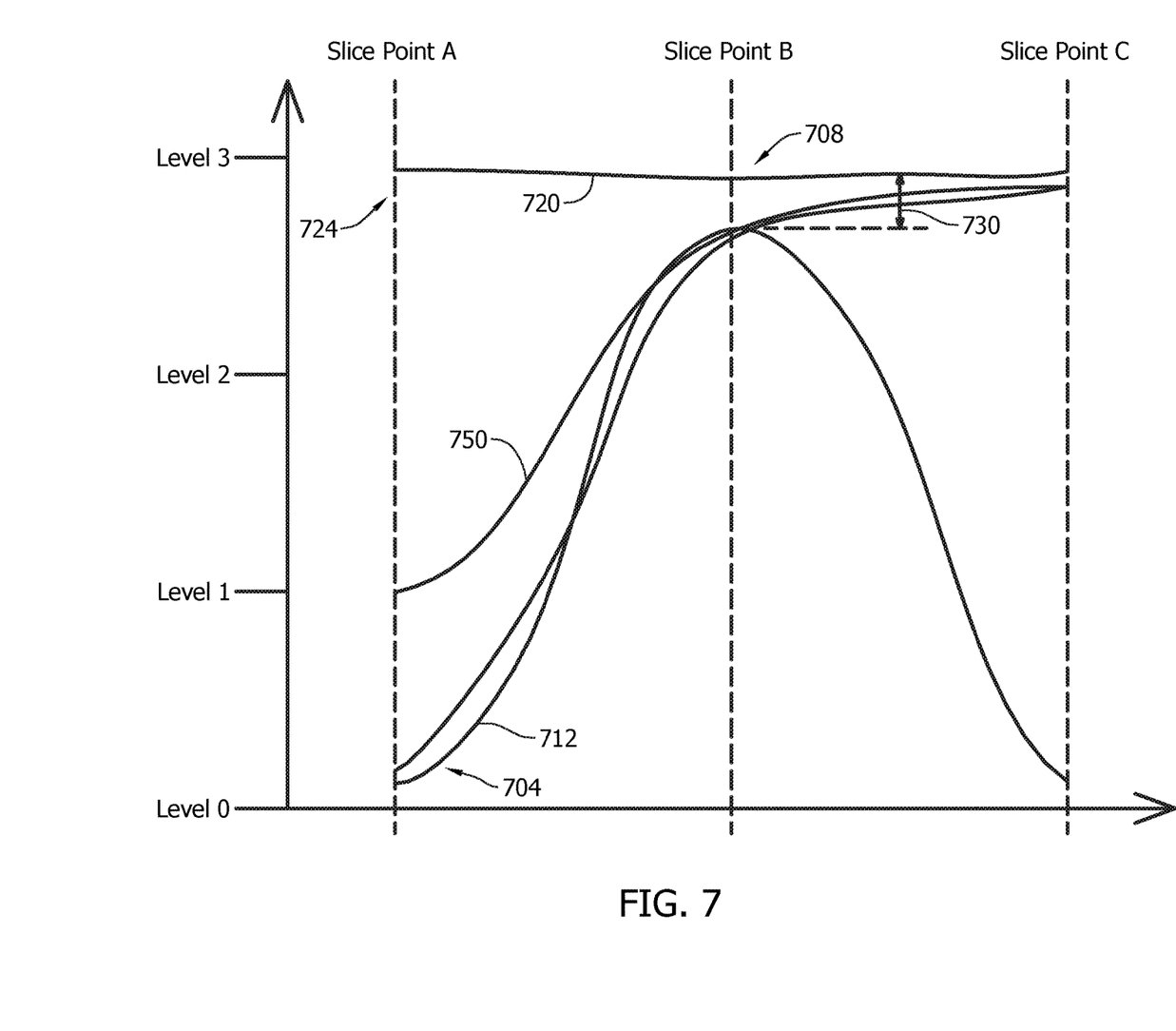
FIG. 7 illustrates a sub-set of signal plots which form an eye diagram for purpose of discussion.

FIG. 7 illustrates a limited number of signal plots which form an eye diagram. As shown, plot 712 transitions from a 0 value to a 3 value and as such contains high frequency signal components. In contrast, plot 720 transitions from a 3 value 724 to a 3 value 708 (or a 0 to 0 transition) and as such, contains low frequency components. Other transitions can occur between other signal levels, such as from 1 value to 3 value shown by plot 750. In the algorithm employed in this innovation, the difference 730 (FIG. 5B) is the difference that is isolated (by the high and the low frequency signal paths) and processed to isolate both the high frequency signal and the low frequency signal. This difference 730 is the signal magnitude for the transition from a 3 value to a 3 value compared to the signal 0 value to a 3 value. The goal is to optimize the difference between a lower frequency signal (3 to 3 transition 720) and a high frequency signal (0 to 3 transition 712).

The first step is to obtain high frequency signal component information and low frequency signal component information which is used to create a difference or error signal. Then the difference is processed to generate the optimal equalizer coefficient values, which are fed back to the CTLE to have the CTLE optimal equalization.

Returning to FIG. 6, a HF data pattern filter 620 receives two signals, namely, the error from the HF de-serializer 616A and the data from data de-serializer 616B. The HF data pattern filter 620 also receives a data pattern mask 636 and a data pattern 640. The data pattern mask controls up to 4 symbols window and which symbols are used to filter the input data from the de-serializer. Bit 1 means symbol is valid for data pattern filter. An example of the data pattern mask 636 is b0110 where b represents the bit or binary pattern. In this case, two symbols are valid for data filter. The data pattern 640 defines the high frequency transition that is passed through the filter 620. For example, the data pattern 640 may be a transition from 0 to 3, or the transitions of 0 to 0 to 3 to 3, which may have different curves in the eye diagram. To confirm, the data pattern mask 636 and the data pattern 640 are used to determine which data transition are passed out of the filter. Hence, the incoming data is filtered to select the desired transition which is output. The data pattern mask 636 is a mask which only selects valid symbols in a 4 symbol window, and the data pattern input 640 defines what data transition pattern to filter. In this embodiment, the data pattern may be from 0 to 3, which is two symbols or may be 0 to 0 to 3 to 3, which is four symbols. In other embodiments, other symbol transitions may be used. Training may occur on any transition, but in this embodiment, it is on the transition from 0 to 3. Only the input data which matches the pattern defined by inputs 636, 640 is output from the data pattern match, which is a subset of the input data.

Turning to the LF data pattern filter 624 associated with the low frequency path, a similar method of operation occurs. The data pattern filter 624 receives a data pattern mask 644 and a data pattern 648 and the data pattern filter operates as described above for the data pattern filter 620 to output error from a data subset of the incoming data based on the pattern mask and the defined data pattern transition, in this embodiment, the transition from 3 value to 3 value. Because the values do not change, this is the low frequency path. In other embodiments, other data patterns may be used, such as 3 to 3 to 3 or 0 to 0. It is preferred that the high frequency path and the low frequency path both focus on the same PAM4 symbol level. The data pattern filters 620, 624 may comprise logic elements. In one embodiment, the data pattern mask is configured as AND gates to filter out two symbols and the data pattern is used as the comparison to obtain two symbols and compare the symbols to determine if the values of the symbols match the 0 3 pattern. If the incoming data symbol matches the 0 3 transition, its error is passed to the output and if it does not match then its error is discarded.

The output of the data pattern filter 620 is forwarded to the voltage threshold high frequency adaptation block 628. Similarly, the output of the data pattern filter 624 is forwarded to the voltage threshold low frequency adaptation block 632. The adaptation blocks 628, 632 tracks their respective input (from the data pattern filter62,0 624), which are errors, and sets the slicer feedback outputs em Vth (threshold) as the midpoint such that 50% of its inputs are above the slicer feedback outputs em Vth (threshold) and 50% are below the slicer feedback outputs em Vth (threshold), for each adaptation block. Thus, the em Vth (threshold) signal is continually being updated to maintain one half of the error inputs to the adaptation block 628, 632 are 0, and one half of the inputs to the adaptation block are 1. Thus, the em Vth value is calculated to dithering at or near the midpoint level. This em Vth value (slicer threshold) is fed back to the sliders 612A, 612C as shown.

The adaptation blocks 628, 632 also provide an input to a summing junction 652 as shown. In one embodiment, the input to the summing junction 652 is the same value as the feedback signal em Vth but in a different format due to the slicers 612A, 612C requiring a different signal format than the summing junction due to the slicers operating in the analog domain while the summing junction operates in a digital domain. An offset input 656 provides an offset value to the summing junction 652. The summing junction 652 calculates the difference between its two inputs, which is provided to a multiplexer 662. The offset value is injected when the optimal thresholds for the high frequency path slicer 612A and the low frequency path slicer 612C are not the same. The offset may be used to inject a value into the summing junction 652 to adjust or fine tune the CTLE coefficient values.

The output of the summing junction 652 feeds into a two-input multiplexer (switch) 662 such that one of the inputs from the summing junction is inverted. The multiplexer 662 includes a control signal which may be referred to as a sign select, and is dependent on the sign of the difference between HF threshold and LF threshold. When calculating the difference between the HF threshold level and the LF threshold level, a determination is made whether to use the positive or negative input to the multiplexer for the adaptation based on which symbol value is used (0 or 3) based on the direction that the equalizer is being adapted.

FIG. 7 is useful for providing an example. On the high frequency path, the focus is on symbol transitions 0 to 3, and on the low frequency path, the focus is on symbol transitions 3 to 3. The high frequency loop will train or center the high frequency slice point to this level based on the feedback to slicer 612A (FIG. 6). Plot 712 transitions from 0 to 3 at slice point B 708. The low frequency loop will train or center the low frequency slice point to this level based on the feedback to slicer 612C (FIG. 6). Plot 720 transitions from 3 to 3 at slice point B 708. The difference between plot 712 and 720 at slice point B 708 is defined by the difference 730. This difference is revealed by the summing junction 652 (FIG. 6). The low frequency threshold is higher than the high frequency threshold so the error will be positive. Without the offset, the multiplexer signed input should be selected to increase the CTLE boost by selecting the input 0 to the multiplexer 662 as the multiplexer output. The sign (input) selected as the multiplexer output depends on the symbol selected. If symbol 2 or 3 is selected, the positive input select to the multiplexer 662 should be from the multiplexer. If symbol 0 or 1 is used, the negative input select to the multiplexer 662 should be output from the multiplexer. The CTLE adaptation signal (boost control) is fed back to the CTLE 608 via the feedback path. This will bring the transition level for 0 to 3 higher, which will bring the threshold at or near the threshold for the low frequency signal (3 to 3). The goal is to converge, and not diverge the slicer thresholds.

Returning to FIG. 6, a multiplier 666 receives a convergence timing coefficient which controls how often the CTLE adaptation loop updates. A larger convergence timing coefficient causes the CTLE to update more often. The output of the multiplier 666 feeds into an integrating accumulator 670. In one embodiment the integrating accumulator includes an integrator, memory, or registers, and one or more summing junctions, as well as control logic. The integrating accumulator 670 generates an incrementing or decrementing output when predetermined value is reached based on the input from the multiplier. Operation of accumulators is known in the art and as such, is not described in detail. When the system stabilizes, the integrating accumulator 670 will be dithering at or near the optimal value for the CTLE coefficients. However, when the conditions change, the output of the integrating accumulator will adapt to the new conditions. As an advantage of this system over the prior art, the processing resources is minimal thereby freeing resources for other tasks, or otherwise reducing power use and heat generation.

Figure 8A:
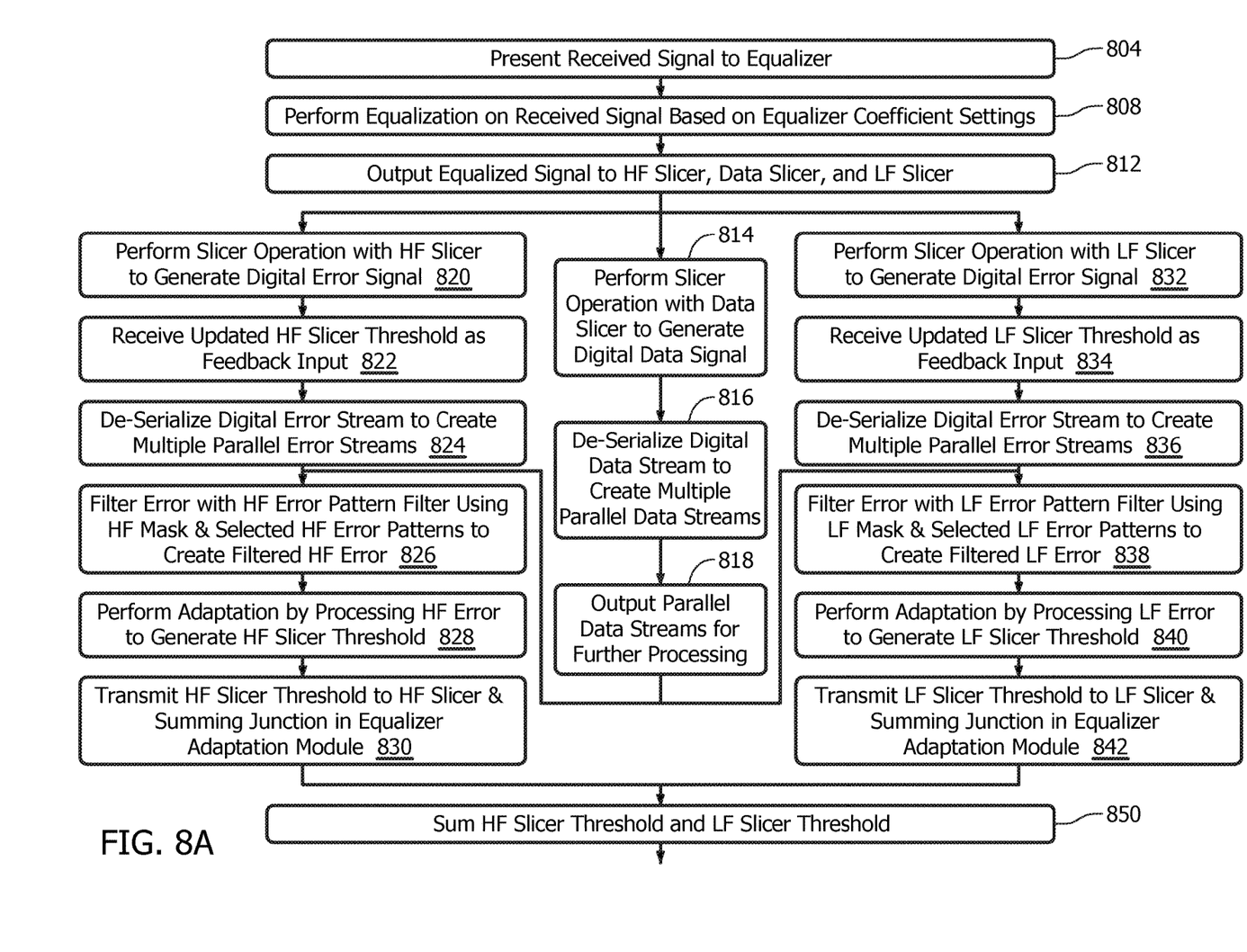
FIG. 8A and FIG. 8B illustrate and operational flow diagram of an example method of operation.
Figure 8B:
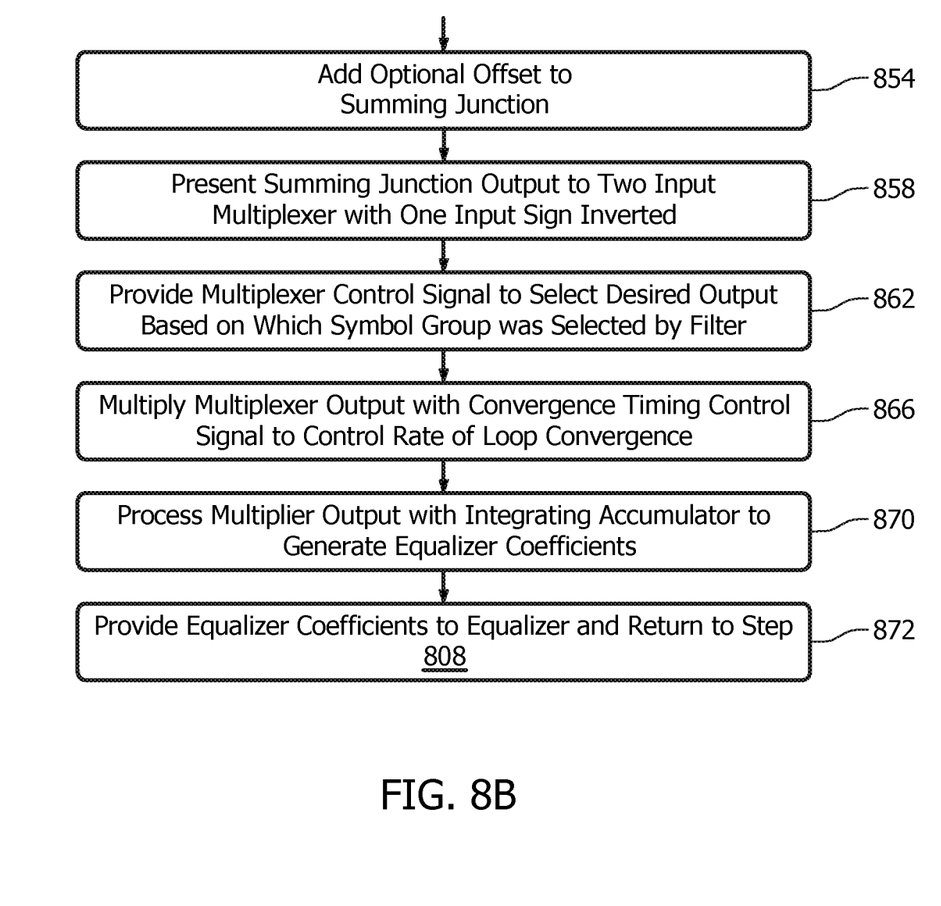

FIGS. 8A and 8B illustrate and operational flow diagram of an example method of operation. In other embodiments, other method of operations may be developed which do not depart from the claims. At a step 804, a receive signal is presented to the equalizer, and then at a step 808 the equalizer performs equalization on the signal, based on the coefficient values of the equalizer, to generate an equalized signal. At a step 812 the equalized signal is provided to a bank of slicer, namely a high frequency (HF) slicer, a data slicer, and a low frequency slicer (LF). At this stage, the operation branches to three independent operational paths through a HF branch, a data branch, and a LF branch.

The data branch includes step 814 at which the data slicers process the data signal to one of two or more distinct values. In this case, the signal is a PAM4 signal, so the slicers quantize the data signal one of 4 different levels. Thereafter, at a step 816 the de-serializer processes the slicer output to create multiple parallel data streams which are at a lower bandwidth than the input to the de-serializer. At a step 818, these parallel data streams are output for further process and the data output.

Turning to the HF branch, at a step 820, the HF slicer slices the data to generate the error signal. The slicing is based on a slicer threshold provided to the HF slider at step 822. It is contemplated that the HF may use a different slider threshold than the data slicer, as determined by the HF slicer threshold feedback signal. Thereafter, at a step 824 the de-serializer processes the slicer output to create multiple parallel error streams which are at a lower bandwidth than the input to the de-serializer. At a step 826, these parallel error streams are filtered with a HF data pattern filter using a HF mask and selected HF data patterns to create filtered error. As discussed herein, the HF data pattern filter only passes certain data based on the HF mask and which HF data patterns are selected.

At a step 828 the HF processing path, and in particular an adaptation block processes the HF filter output to generate a HF slicer threshold. At a step 830, the HF slicer threshold is provided to the HF slicer and to a summing junction in the equalizer adaptation module. The configuration and function of the adaptation block is based on well known LMS algorithm and as such is not described in detail. In one embodiment, the adaptation module comprises a processor, configured to execute machine readable code which may be stored on a memory that is part of or accessible by the adaptation module, and digital logic elements. The HF em slicer uses this updated HF slicer threshold for future slicing operations.

The LF processing branch defined by steps 832, 834, 836, 838, 840, and 842 is generally identical to the HF processing branch just described. However, at a step 838 a different LF mask is used, and different selected LF data patterns are used to filter the error and instead of a HF slicer threshold being created, a LF slicer threshold is provided to the LF slicer and provided to the summing junction.

After steps 830 and 842, the operation advances to step 850 and the summing junction combines the two receive signals, which are the HF slicer threshold and the LF slicer threshold. The HF and LF slicer thresholds returned to the slicers may be in the analog domain while the HF and LF slicer thresholds provided to the summing junction may be in the digital domain. At a step 854 in FIG. 8B, an optional offset is added to the summing junction to be combined with the HF slicer threshold and the LF slicer threshold to adjust the equalization levels (boost up or down) for fine tuning of equalization. At a step 858, the summing junction output is provided to the two input multiplexer with one input having its sign inverted. At a step 862 a multiplexer control signal is provided to the multiplexer to control which input is output from the multiplexer. The selected input is based on the symbol group that was selected. In this embodiment, if symbol group 2, 3 was selected, then the positive input is selected as the output from the multiplexer, while if symbol group 0, 1 was selected, then the negative (inverted) input is selected as the output from the multiplexer. This determination ensures that the equalizer converges the desired equalization level instead of diverging over time.

Next, at a step 866 a multiplier multiplies the multiplexer output with a convergence timing signal to control the rate of loop convergence. A larger multiplication factor reduces the time to loop convergence. At a step 870, the integrating accumulator processes the multiplier output by adding it to its current value to generate the equalizer coefficients. Thereafter, at a step 872, the updated (which may change or be maintained the same over time) equalizer coefficients are provided to the equalizer to optimize equalizer operation.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A system for generating equalizer coefficients comprising:
   an equalizer configured to equalize a received signal to compensate for a channel over which the received signal traveled;
   a data slicer configured to quantize the equalized signal to generate primary sliced data;
   a high frequency error slicer configured to slice the equalized signal to generate first error based on a high frequency slicer threshold;
   a low frequency data slicer configured to slice the equalized signal to generate second sliced error on a low frequency slicer threshold;
   a high frequency processing module comprising:
     a high frequency data pattern filter configured to generate error filtered by high frequency data from the first sliced error;
     a high frequency adaptation module configured process the error filtered by the high frequency data to generate the high frequency slicer threshold;
   a low frequency processing module comprising:
     a low frequency data pattern filter configured to generate error filtered by low frequency data from the second sliced error;
     a low frequency adaptation module configured process the error filtered by the low frequency data to generate the low frequency slicer threshold;
   a summing junction configured to combine the high frequency slicer threshold and the low frequency slicer threshold to create a difference signal; and
   an integrating accumulator configured to processes, over time, the difference signal to generate the equalizer coefficients.

2. The system of claim 1 further comprising one or more de-serializers configured to convert a serial data steam to two or more parallel data streams.

3. The system of claim 1 wherein the high frequency data pattern filter filters the sliced data based on a high frequency data pattern mask and a high frequency data pattern.

4. The system of claim 1 wherein the high frequency adaptation module processing comprises an integrating accumulator that accumulates HF errors and generates HF slicer threshold.

5. The system of claim 1 further comprising a multiplexer configured to output the difference signal or an inverted version of the difference signal responsive to a control signal.

6. The system of claim 1 further comprising a multiplier configured to multiply the difference signal or an inverted version of the difference signal with an adaptation timing control signal to control the rate at which the equalizer coefficient are updated.

7. A method for adapting an equalizer to a channel comprising:
   filtering a high frequency error monitor slicer output and a data slicer output to isolate errors selected by high frequency symbol values;
   filtering a low frequency error monitor slicer output and the data slicer output to isolate errors selected by low frequency symbol values;
   generating a high frequency error monitor slicer threshold signal with a first adaptation module;
   generating a low frequency error monitor slicer threshold signal with the first adaptation module or a second adaption module;
   providing the high frequency error monitor slicer threshold signal to a high frequency error monitor slicer;
   providing the low frequency error monitor slicer threshold signal to a low frequency error monitor slicer;
   combining the high frequency error monitor slicer threshold signal and the low frequency error monitor slicer threshold signal to generate a difference signal; and
   integrating the difference signal with an accumulator to generate equalizer coefficients to adapt the equalizer to the channel.

8. The method of claim 7 further comprising:
   quantizing an equalized signal based on the high frequency error monitor slicer threshold signal to generate the high frequency error monitor slicer output;
   quantizing the equalized signal based on the low frequency error monitor slicer threshold signal to generate the high frequency error monitor slicer output; and
   quantizing the equalized signal with a data slicers to generate the data slicer output.

9. The method of claim 7 further comprising adding an offset to the difference signal.

10. The method of claim 7 further comprising multiplying the difference signal with an adaptation timing control signal to control the rate of change of adaptation of the equalizer.

11. The method of claim 7 further comprising providing either the difference signal or an inverted difference signal to the accumulator based on which symbol group was filtered.

12. The method of claim 7 wherein filtering the high frequency error monitor slicer output and the data slicer output is based on a high frequency data mask and a high frequency data pattern and filtering the low frequency error monitor slicer output and the data slicer output is based on a low frequency data mask and a low frequency data pattern.

13. A method for adapting an equalizer by generating equalizer coefficients comprising:
   generating a high frequency slicer threshold value by filtering high frequency components of an equalized signal;
   generating a low frequency slicer threshold value by filtering low frequency components of an equalized signal;
   combining the high frequency slicer threshold value and the low frequency slicer threshold value to create a difference signal;
   accumulating the difference signal over time with an integrating accumulator to generate an accumulator value and updating equalizer coefficients when the accumulator value reaches a predetermined value.

14. The method of claim 13 further comprising providing the high frequency slicer threshold value to a high frequency error monitor slicer and providing the low frequency slicer threshold value to a low frequency error monitor slicer.

15. The method of claim 13 further comprising adding an offset to the difference signal to adjust the equalizer coefficients.

16. The method of claim 13 further comprising multiplying the difference signal with an adaptation timing control signal to control the rate of change of adaptation of the equalizer.

17. The method of claim 13 further comprising providing either the difference signal or an inverted difference signal to the accumulator based on which symbol group was filtered.

18. The method of claim 13 wherein generating the high frequency slicer threshold value is based on a high frequency data mask and a high frequency data pattern and generating the low frequency slicer threshold value is based on a low frequency data mask and a low frequency data pattern.

* * * * *